(12) United States Patent
Deckard

(10) Patent No.: US 11,081,112 B1
(45) Date of Patent: Aug. 3, 2021

(54) VOICE-TO-TEXT CANE SYSTEM

(71) Applicant: Bonnie Deckard, Palm Harbor, FL (US)

(72) Inventor: Bonnie Deckard, Palm Harbor, FL (US)

(*) Notice: Subject to any disclaimer, the term of this patent is extended or adjusted under 35 U.S.C. 154(b) by 22 days.

(21) Appl. No.: 16/287,691

(22) Filed: Feb. 27, 2019

Related U.S. Application Data

(60) Provisional application No. 62/644,197, filed on Mar. 16, 2018.

(51) Int. Cl.
| | | |
|---|---|---|
| *G10L 15/26* | (2006.01) | |
| *A45B 3/04* | (2006.01) | |
| *G09B 21/00* | (2006.01) | |

(52) U.S. Cl.
CPC ............... *G10L 15/26* (2013.01); *A45B 3/04* (2013.01); *G09B 21/009* (2013.01)

(58) Field of Classification Search
CPC ................................. G10L 15/26; A45B 3/04
USPC ....................................................... 704/231
See application file for complete search history.

(56) References Cited

U.S. PATENT DOCUMENTS

| | | | | |
|---|---|---|---|---|
| 5,771,910 A * | 6/1998 | Kluttz | ...................... | A61H 3/02 135/68 |
| 7,954,502 B2 * | 6/2011 | Townsend | ................ | A61H 3/02 135/82 |
| 8,475,275 B2 * | 7/2013 | Weston | .................... | A63F 13/31 463/39 |
| 8,531,050 B2 * | 9/2013 | Barney | .................... | A63F 13/10 290/1 R |
| 8,686,579 B2 * | 4/2014 | Barney | ................... | A63F 13/10 290/1 R |
| 8,814,688 B2 * | 8/2014 | Barney | ................... | A63H 33/26 463/39 |
| 9,039,533 B2 * | 5/2015 | Barney | ................... | A63J 21/00 463/39 |
| 9,138,367 B2 * | 9/2015 | Thacker | .................. | A61G 17/02 |
| 9,138,650 B2 * | 9/2015 | Barney | ................. | A63F 13/327 |
| 9,393,500 B2 * | 7/2016 | Barney | ................... | A63F 13/00 |
| 9,726,746 B2 * | 8/2017 | Said | ........................ | H04W 4/33 |
| 9,770,652 B2 * | 9/2017 | Barney | ................. | A63F 13/211 |
| 9,881,503 B1 * | 1/2018 | Goldman-Shenhar | ...................... | G05D 1/0088 |
| 9,983,289 B2 * | 5/2018 | Said | ........................ | H04W 4/80 |
| 10,022,624 B2 * | 7/2018 | Barney | ................... | A63F 13/10 |
| 10,132,910 B2 * | 11/2018 | Said | ........................ | G01S 5/0027 |
| 10,352,962 B2 * | 7/2019 | Douglas | ................. | G16H 40/63 |
| 10,369,463 B2 * | 8/2019 | Barney | ................... | A63H 33/26 |
| 10,609,992 B2 * | 4/2020 | AlGhazi | ............ | G08B 21/0461 |
| 10,704,245 B2 * | 7/2020 | Marcell | ...................... | E03D 9/00 |
| 10,733,866 B2 * | 8/2020 | Rabinowitz | ........... | A61B 5/1112 |

* cited by examiner

*Primary Examiner* — Susan I McFadden
(74) *Attorney, Agent, or Firm* — GrayRobinson, P.A.; Michael J. Colitz, III

(57) ABSTRACT

A cane has an upper extent, a lower extent, and a central extent there between. The lower extent has a cylindrical configuration and includes a threaded coupling to the central extent for lengthening and shortening purposes. The central extent has an LCD screen for displaying text messages. A speaker in the upper extent is audibly accessible to a user. A processor is operatively coupled to the speaker and the LCD screen and a source of electrical potential.

3 Claims, 2 Drawing Sheets

VOICE-TO-TEXT CANE SYSTEM

RELATED APPLICATION

This application is based upon Provisional Application No. 62/644,197 entitled "Voice-to-Text Cane System" filed Mar. 16, 2018, which is incorporated herein by reference and the priority of which is claimed.

BACKGROUND OF THE INVENTION

Field of the Invention

The present invention relates to a voice-to-text cane system and more particularly pertains to helping a walking-impaired person to walk and for converting spoken words into written words to assist a hearing-impaired person in a safe, convenient, and economical manner.

DESCRIPTION OF THE PRIOR ART

The use of cane systems of known designs and configurations is known in the prior art. More specifically, cane systems of known designs and configurations previously devised and utilized for the purpose of assisting walking-impaired and hearing-impaired individuals are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a voice-to-text cane system that allows helping a walking-impaired person to walk and for converting spoken words into written words to assist a hearing-impaired person in a safe, convenient, and economical manner.

In this respect, the voice-to-text cane system according to the present invention substantially departs from the conventional concepts and designs of the prior art, and in doing so provides an apparatus primarily developed for the purpose of helping a walking-impaired person to walk and for converting spoken words into written words to assist a hearing-impaired person in a safe, convenient, and economical manner.

Therefore, it can be appreciated that there exists a continuing need for a new and improved voice-to-text cane system which can be used for helping a walking-impaired person to walk and for converting spoken words into written words to assist a hearing-impaired person in a safe, convenient, and economical manner. In this regard, the present invention substantially fulfills this need.

SUMMARY OF THE INVENTION

In view of the disadvantages inherent in the known types of cane systems of known designs and configurations now present in the prior art, the present invention provides an improved voice-to-text cane system. As such, the general purpose of the present invention, which will be described subsequently in greater detail, is to provide a new and improved voice-to-text cane system and method which has all the advantages of the prior art and none of the disadvantages.

To attain this, the present invention essentially comprises a voice-to-text cane system 10. In this broad contest, first provided is a cane 14 having an upper extent 16, a lower extent 18, and a central extent 20 there between. The lower extent has a cylindrical configuration and includes a threaded coupling 28 to the central extent to lengthen and shorten the system. The central extent has an LCD screen 32, 34 for displaying text messages. A speaker 38 is provided in the upper extent and is audibly accessible to a user. A processor 42 is operatively coupled to the speaker and the LCD screen. A source of electrical potential 46 is provided.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved voice-to-text cane system which has all of the advantages of the prior art cane systems of known designs and configurations of known designs and configurations and none of the disadvantages.

It is another object of the present invention to provide a new and improved voice-to-text cane system which may be easily and efficiently manufactured and marketed.

It is further object of the present invention to provide a new and improved voice-to-text cane system which is of durable and reliable constructions.

An even further object of the present invention is to provide a new and improved voice-to-text cane system which is susceptible of a low cost of manufacture with regard to both materials and labor, and which accordingly is then susceptible of low prices of sale to the consuming public, thereby making such voice-to-text cane system economically available to the buying public.

Lastly, it is another object of the present invention is to provide a voice-to-text cane system which can be used for helping a walking-impaired person to walk and for converting spoken words into written words to assist a hearing-impaired person in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
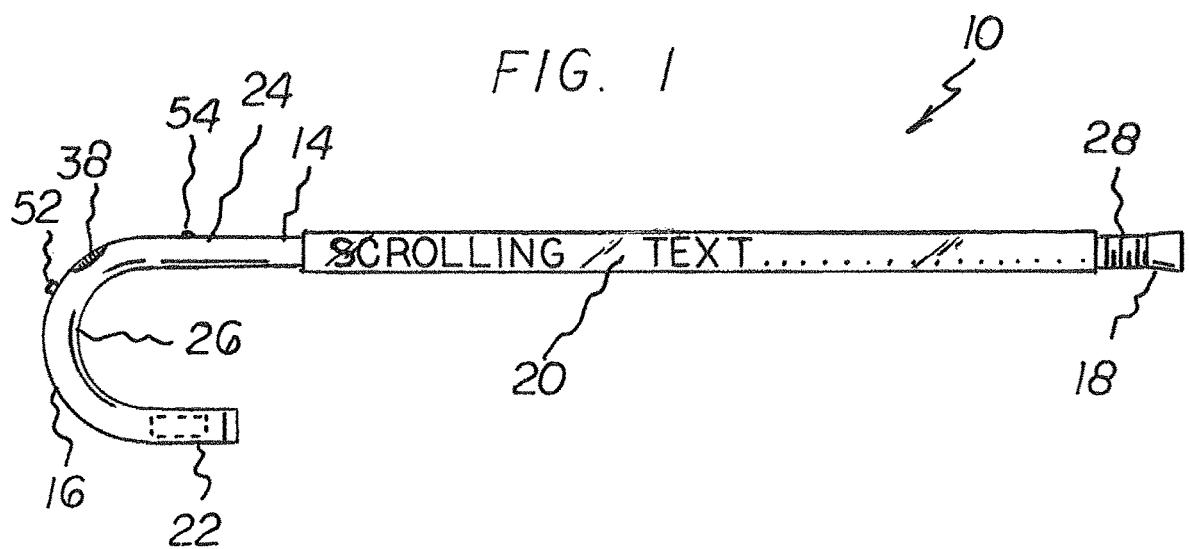
FIG. 1 is a side elevational view of a voice-to-text cane system constructed in accordance with the principles of the present invention.
Figure 2:
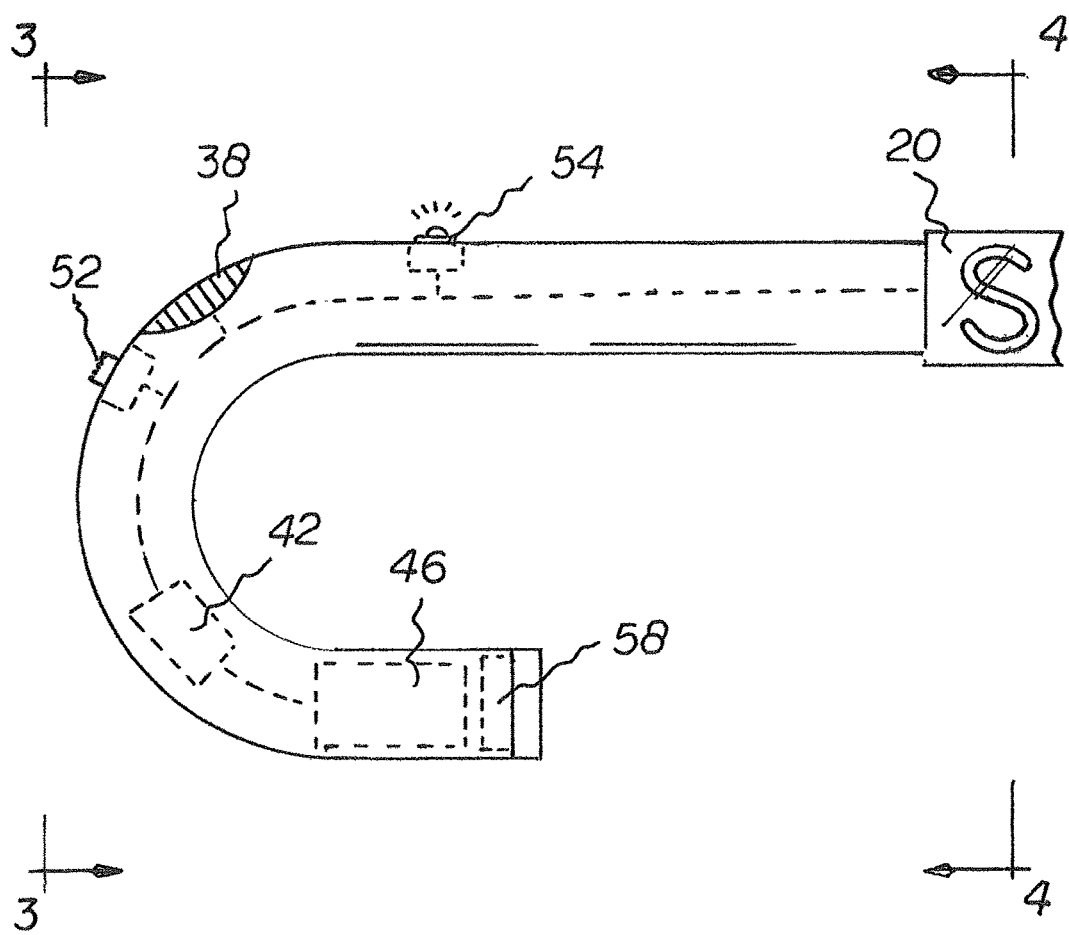
FIG. 2 is an enlarger side elevational view of the upper extent of the system shown in FIG. 1.
Figure 3:
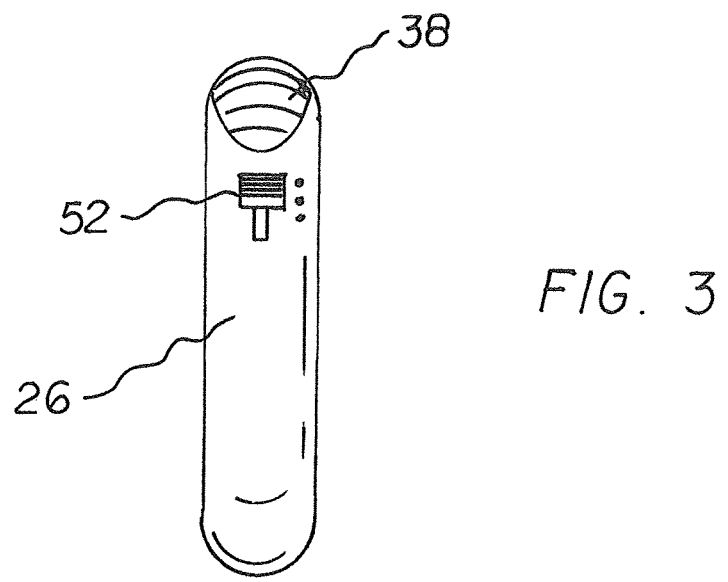
FIG. 3 is a plan view taken along line 3-3 of FIG. 2.
Figure 4:
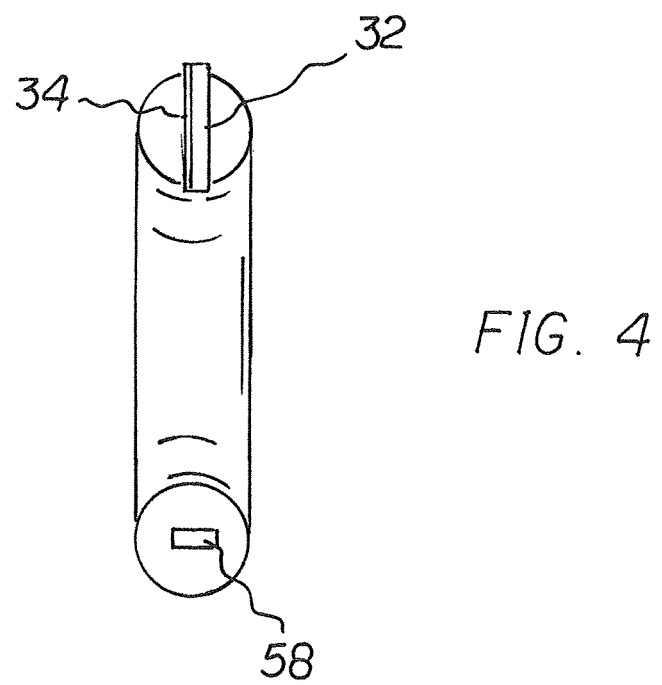
FIG. 4 is a cross sectional view taken along line 4-4 of FIG. 2.

With reference now to the drawings, and in particular to FIG. 1 thereof, the preferred embodiment of the new and improved voice-to-text cane system embodying the principles and concepts of the present invention and generally designated by the reference numeral 10 will be described.

The present invention, the voice-to-text cane system 10 is comprised of a plurality of components. In their broadest context such include a cane, a speaker, a processor, and a source of electrical potential. Such components are individually configured and correlated with respect to each other so as to attain the desired objective.

In the preferred embodiment of the voice-to-text cane system, designated by reference numeral 10, first provided is a cane 14 having an upper extent 16, a lower extent 18, and a central extent 20 there between. The upper extent is in a J-shaped configuration with a first vertical leg 22 of a first length and a second vertical leg 24 of a second length and a semi-circular extent 26 there between. The first length is longer than the second length. The upper extent is hollow with an exterior surface and an interior surface. The upper extent has a circular cross sectional configuration. The upper extent is in a first plane.

The lower extent has a cylindrical configuration. The lower extent includes a threaded coupling 28 to the central extent to lengthen and shorten the system for accommodating a user.

The central extent has a rectilinear configuration with oppositely facing parallel faces 32, 34. Each of the parallel faces constitutes an LCD screen for displaying text messages. Each of the parallel faces is in a plane parallel with the first plane.

Next, a speaker 38 is provided within the upper extent. The speaker is audibly accessible to a user.

Next, a processor 42 is provided within the upper extent. The processor is operatively coupled to the speaker and the LCD screens. The processor is adapted to translate between the language received by the speaker and the language displayed by the LCD screens.

Next, a source of electrical potential 46 is provided within the second leg. A removable end cap 48 is adapted to be removed from the upper extent for supplying a new source of electrical potential.

A switch 52 is next provided. The switch is coupled to the upper extent to activate and inactivate the system.

Next, a source of illumination 54 is provided. The source of illumination is located in the upper extent.

Lastly, a data port 58 is provided in the upper extent. The data port provides access to the processor to change the operating characteristics of the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A voice-to-text cane system comprising:
   a cane having an upper extent and a lower extent and a central extent there between;
   the lower extent having a cylindrical configuration, the lower extent including a threaded coupling to the central extent to lengthen and shorten the system;
   the central extent having an LCD screen for displaying text messages;
   a speaker in the upper extent audibly accessible to a user;
   a processor operatively coupled to the speaker and the LCD screen, the processor adapted to convert voice-to-text and to display the text on the LCD screen; and
   a source of electrical power for the system.

2. The system as set forth in claim 1 wherein the upper extent is in a J-shaped configuration with a first vertical leg of a first length and a second vertical leg of a second length and a semi-circular intermediate extent therebetween.

3. A voice-to-text cane system for helping a walking-impaired person to walk and for converting spoken word into written words to assist a hearing-impaired person comprising, in combination:
   a cane having an upper extent and a lower extent and a central extent there between, the upper extent being in a J-shaped configuration with a first vertical leg of a first length and a second vertical leg of a second length and a semi-circular extent there between, the first length being longer than the second length, the upper extent being hollow with an exterior surface and an interior surface, the upper extent having a circular cross sectional configuration, the upper extent being in a first plane;
   the lower extent having a cylindrical configuration, the lower extent including a threaded coupling to the central extent to lengthen and shorten the system for accommodating a user;
   the central extent having a rectilinear configuration with oppositely facing parallel faces, each of the parallel faces constituting an LCD screen for displaying text messages, each of the parallel faces being in a plane parallel with the first plane;

a speaker within the upper extent, the speaker being audibly accessible to a user;

a processor within the upper extent, the processor being operatively coupled to the speaker and the LCD screens, the processor adapted to convert voice-to-text by translating between the language received by the microphone and the language displayed by the LCD screens;

a source of electrical power within the second leg, a removable end cap adapted to be removed from the upper extent for supplying a new source of electrical power;

a switch (52) coupled to the upper extent to activate and inactivate the system;

a source of illumination (54) located in the upper extent; and a data port (58) in the upper extent to provide access to the processor to change the operating characteristics of the system.

\* \* \* \* \*